US008781293B2

United States Patent
Ni et al.

(10) Patent No.: US 8,781,293 B2
(45) Date of Patent: Jul. 15, 2014

(54) CORRECTION METHOD FOR OBJECT LINKING ACROSS VIDEO SEQUENCES IN A MULTIPLE CAMERA VIDEO SURVEILLANCE SYSTEM

(75) Inventors: Sze-Yao Ni, Taipei (TW); Tom C.I. Lin, Taipei (TW); Yuang-Tzong Lan, Taipei (TW); Jiann Cherng Luo, Taipei (TW)

(73) Assignee: Gorilla Technology Inc., Taipei (TW)

( * ) Notice: Subject to any disclaimer, the term of this patent is extended or adjusted under 35 U.S.C. 154(b) by 0 days.

(21) Appl. No.: 13/589,502

(22) Filed: Aug. 20, 2012

(65) Prior Publication Data

US 2014/0050455 A1    Feb. 20, 2014

(51) Int. Cl.
*H04N 5/77* (2006.01)

(52) U.S. Cl.
CPC .................... *H04N 5/772* (2013.01)
USPC ............................ 386/224; 386/290; 348/152

(58) Field of Classification Search
CPC ....... H04N 7/181; H04N 7/183; H04N 7/188; H04N 5/85; G11B 27/34; G11B 27/034; G11B 27/105
USPC ................... 348/152, 153, 169; 386/290, 224
See application file for complete search history.

(56) References Cited

U.S. PATENT DOCUMENTS

| 7,242,423 B2 | 7/2007 | Lin |
| 2005/0207622 A1* | 9/2005 | Haupt et al. .................. 382/118 |
| 2010/0045799 A1* | 2/2010 | Lei et al. ...................... 348/169 |
| 2010/0157049 A1* | 6/2010 | Dvir et al. .................... 348/143 |

FOREIGN PATENT DOCUMENTS

TW          200943963          10/2009

* cited by examiner

*Primary Examiner* — Thai Tran
*Assistant Examiner* — William Tran
(74) *Attorney, Agent, or Firm* — Min-Lee Teng; Litron Patent & Trademark Office

(57) ABSTRACT

The invention discloses a correction method and system for object linking in video sequences that are captured by a multiple camera surveillance video system. The invention allows a user to select a specific object to track and for trace correction through an interactive user platform. The interactive user platform shows a video sequence captured by the user-selected camera at the selected time; lists of previous and post video sequences related to the user-selected object or video sequences, and lists of object linking results before and after the selected time. The user refers to the linking results, shown in lists of object linking results before and after the selected time to select one of objects for correction in selected frame of selected video sequence. The selection directs the proposed system to correct the trace of the specific object to track. Henceforth, the correct linking results can be automatically generated.

8 Claims, 13 Drawing Sheets

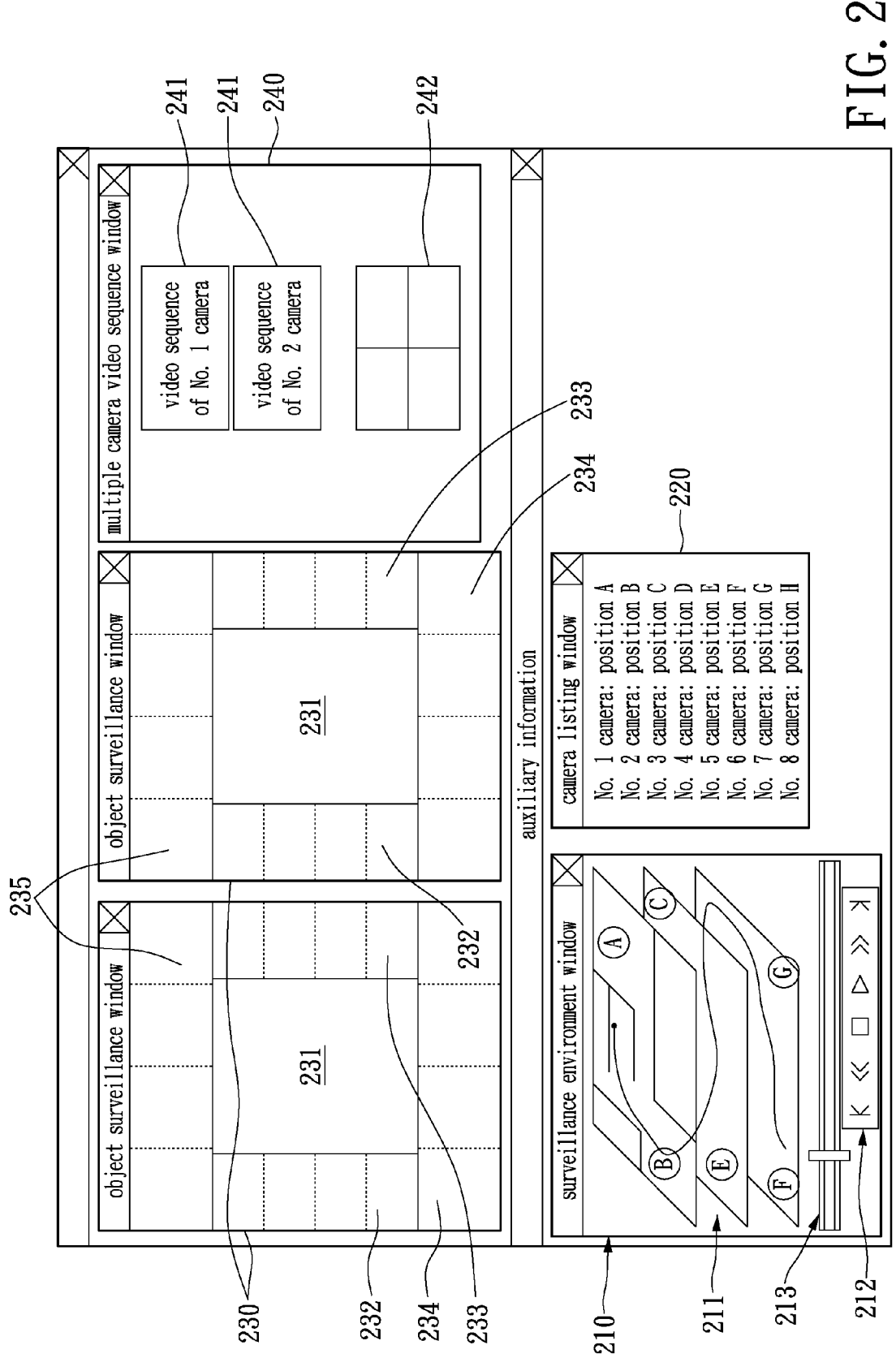

FIG. 6B

CORRECTION METHOD FOR OBJECT LINKING ACROSS VIDEO SEQUENCES IN A MULTIPLE CAMERA VIDEO SURVEILLANCE SYSTEM

BACKGROUND

1. Technical Field

The present disclosure relates to a multiple camera video surveillance system, in particular, to a correction method for errors in linking objects from multiple video sequences in a multiple camera video surveillance system and a multiple camera video surveillance system using the same.

2. Description of Related Art

A conventional video surveillance system provides specific object detection service for a single surveillance region, meanwhile sending the related video information and detection results back to a central server. However, the application of video surveillance methods for providing specific object detection service for a single surveillance region has been unable to satisfy all needs. For example, the application of post video analysis in practice often requires one to provide full descriptions including time and position trace related to people, events and objects within the overall surveillance system coverage to completely describe an incident. Consequently, specific event detection service for a specific environment has not been able to enable post video analysis. Therefore, multiple camera video surveillance systems have become the mainstream in current video surveillance systems.

Most modern multiple camera surveillance systems forward the video captured by each camera located in their specific surveillance region back to the central server. The central server further analyzes the video associated with each camera to obtain analysis results of objects in a single video sequence. Afterward, the central server obtains the temporal and spatial relations among objects in each corresponding video sequence (i.e., the positions and order of occurrence associated with each object in the corresponding surveillance region) and links a specific object according to the temporal relation among all discovered objects to obtain the trace information and the historical video sequence associated with the specific object in the overall multiple camera video surveillance environment.

Please refer to the U.S. Pat. No. 7,242,423 having the invention name of "Linking zones for object tracking and camera handoff". The invention discloses a multiple camera video surveillance system that can analyze the video information captured by each camera independently so as to obtain the analysis for the detection and tracking result associated with each object in the surveillance range of a single video camera. Furthermore, the described video surveillance system extracts the relation between the locations of appearing and leaving objects and the corresponding time point thereof associated with each object in the surveillance range of each video camera based on the analysis result. Subsequently, a probability distribution function is established according to the relation between the locations of appearing and leaving objects and the corresponding time point thereof. Consequently, the described video camera surveillance system can predict the relations among the objects appearing in each video sequence using the above described probability distribution function so as to link a specific object in each video sequence to acquire the historical video image and the trace information associated with the specific object in the overall multiple camera video surveillance environment.

Moreover, please refer to the TW patent application No. 200943963 entitled "Integrated image surveillance system and manufacturing method thereof". This application illustrates an image registration method that registers multiple video sequences captured by multiple video cameras, respectively, into a single video sequence to reduce the monitoring load of the user. Even though registering multiple video sequences of multiple video cameras into a single video sequence may effectively reduce the monitoring load of the user, this patent application has not disclosed a corresponding intelligent multiple camera video surveillance content analysis system to aid the user. In addition, because the size of the registered single video sequence is large, it could cause a high computation load on an intelligent multiple camera video surveillance content analysis system.

The aforementioned multiple camera video surveillance systems extract the trace images of each specific object based on the adopted algorithms of video analysis and object linking, automatically linking the identical specific objects from each captured video sequence. However, the actual environment may be different to the assumption of the adopted algorithms, and each method can generate different degrees of errors. Consequently, the aforementioned multiple camera video surveillance systems may mislink different objects and be unable to perform correction in an efficient manner.

SUMMARY

An exemplary embodiment of the present disclosure provides an object linking method and correction method thereof for video sequences captured by a multiple camera surveillance video system. The method is described as follows. Provides an interactive user platform for a user to select a specific object to track. Defines a time boundary based on the recording time of the selected video sequence. Lists the video sequences having related objects associated with the specific object to track appeared in the surveillance video sequence captured by each camera before and after the recording time in chronological order in a list of previous video sequence related to user-selected object or video sequence and a list of post video sequence related to user-selected object or video sequence, respectively. Performs correspondence evaluation according to the correspondence between objects to generate the object linking result of objects across cameras. Lists the generated linking result according to the time boundary defined in the object linking result before the selected time and the object linking result after the selected time. Or equivalently, sequentially lists numerous video sequences related to the trace image of the automatically linked specific object in the object linking result before the selected time of the interactive user platform in chronological order and the associated level of correspondence. The numerous video sequences contain the specific object to track which are captured by cameras other than the user-selected camera before the recording time of the selected video sequence.

An exemplary embodiment of the present disclosure provides a multiple camera surveillance video system. The multiple camera surveillance video system includes a plurality of video capturing and analyzing units, a plurality of video analysis data integration units, a video and analysis data database, a multiple video content analysis unit and an interactive user platform. Each video capturing and analyzing unit consists of a digital camera connected to a video analysis device, wherein the video analysis device is implemented by a chipset, a computer, or an embedded system platform. The video capturing and analyzing units are deployed in selected locations of the surveillance environment in the multiple camera surveillance video system. Each video capturing and analyzing unit is connected to a corresponding video analysis data integration unit which in turn is connected to the video and analysis data database. The multiple video content analysis unit is connected to the interactive user platform. The interactive user platform is provided for the user to select a specific object to track and for correcting the specific object's trace, if necessary. The interactive user platform provides user with option to select a potentially matching object for correction in a video sequence not having the highest correspondence from a list of post video sequence related to user-selected object or video sequence through referencing a list of previous video sequence related to user-selected object or video sequence, a list of post video sequence related to user-selected object or video sequence, an object linking result before the selected time, and an object linking result after the selected time provided so as to have the multiple video content analysis unit correcting the automatically linking result associated with the selected specific object to track.

The interactive user platform defines a time boundary based on the recording time of the selected video sequence. The interactive user platform sequentially lists the video sequences from all cameras that contain potentially matching objects matching the specific object to track before and after the recording time in chronological order in a list of previous video sequence related to user-selected object or video sequence and a list of post video sequence related to user-selected object or video sequence of the interactive user platform. Moreover, the system performs correspondence evaluation according to the correspondence between objects to generate the object linking result across cameras. Lists the linking result according to the time boundary defined previously in the object linking result before the selected time and the object linking result after the selected time. Or equivalently, sequentially lists numerous video sequences related to the trace image of the automatically linked specific object containing the specific object to track captured by cameras other than the user-selected camera before the recording time of the selected video sequence in the object linking result before the selected time of the interactive user platform according in chronological order and the associated level of correspondence. Sequentially lists numerous video sequences related to the trace image of the automatically linked specific object containing the specific object to track captured by cameras other than the user-selected camera after the recording time of the selected video sequence in the object linking result after the selected time of the interactive user platform in chronological order and the associated level of correspondence. The user further determines whether or not the linking result is correct through referencing the list of previous video sequence related to user-selected object or video sequence, the list of post video sequence related to user-selected object or video sequence, the object linking result before the selected time, and the object linking result after the selected time. If the linking result contained errors, the user selects one of the objects for correction from the list of user-selected object or video sequence to direct the multiple camera surveillance video system correcting the automatically linking result of the specific object.

To sum up, an exemplary embodiment of the instant disclosure provides a multiple camera surveillance video system adopting a correction method for the specific object to track in the selected video sequence. The multiple camera surveillance video system further has an interactive user platform provided for the user to perform operations. The user may thereby correct the possible linking errors that had occurred in the automated object linking process of the conventional multiple camera surveillance video system by executing the correction method for object linking in the selected video sequence.

In order to further understand the details of this disclosure, the following descriptions and appended drawings are hereby referred through which the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 2 is a conceptual diagram illustrating a correction method for linking objects in video sequences on an interface associated with an interactive user platform provided in accordance with an exemplary embodiment of the present disclosure.

FIG. 6B is a detailed diagram illustrating an object surveillance window provided in accordance with an exemplary embodiment of the present disclosure.

FIG. 8-1 and FIG. 8-2 are flowcharts illustrating a correction method for linking objects of video sequences provided in accordance with an exemplary embodiment of the present disclosure.

DESCRIPTION OF THE EXEMPLARY EMBODIMENTS

Figure 1:
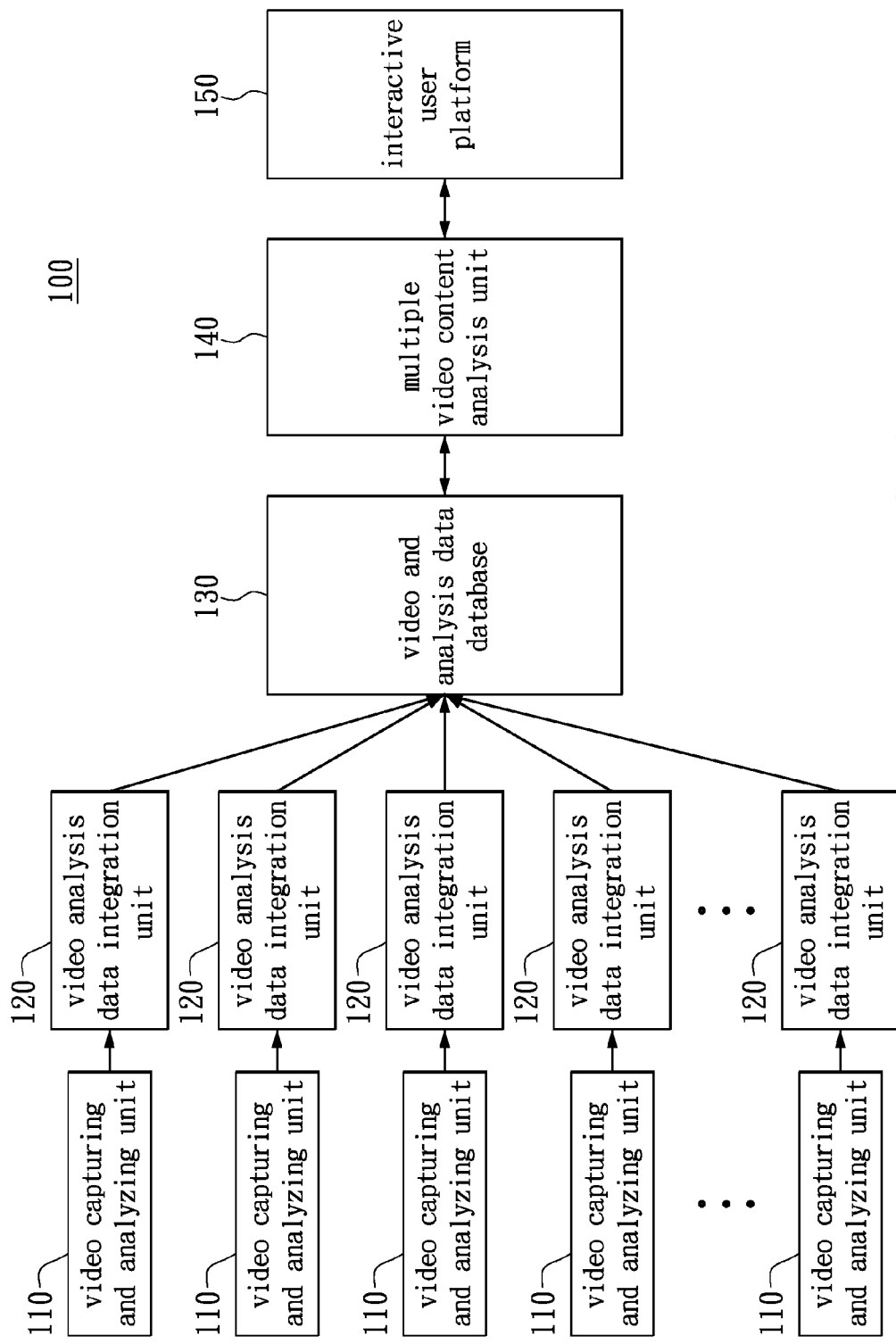
FIG. 1 is a block diagram of a multiple camera video surveillance system provided in accordance with an exemplary embodiment of the present disclosure.

Reference will now be made in detail to the embodiments of the present disclosure, examples of which are illustrated in the accompanying drawings. Wherever possible, the same reference numbers are used in the drawings and the description to refer to the same or like parts.

Please refer to FIG. 1, which describes a block diagram illustrating a multiple camera video surveillance system provided in accordance with an exemplary embodiment of the present disclosure. The multiple camera video surveillance system 100 includes a plurality of video capturing and analyzing units 110, a plurality of video analysis data integration units 120, a video and analysis data database 130, a multiple video content analysis unit 140, and an interactive user platform 150. The plurality of video capturing and analyzing units 110 are deployed in various locations for monitoring different surveillance regions. Each video capturing and analyzing unit 110 is connected to a corresponding video analysis data integration unit 120. The video analysis data integration units 120 are further respectively connected to the video and analysis data database 130. The video and analysis data database 130 is connected to the multiple video content analysis unit 140, and the multiple video content analysis unit 140 is connected to the interactive user platform 150.

The video capturing and analyzing units 110 are used to acquire video sequences associated with the monitored surveillance regions. Each object and the characteristic information thereof having physical definitions in the video sequence are extracted so as to obtain each object's analysis results. A video capturing and analyzing unit 110 outputs video sequences and the associated object analysis results to the respective video analysis data integration unit 120. The video sequences captured by the video capturing and analyzing unit 110 at various time points may collectively form a video sequence.

Specifically, a video capturing and analyzing unit 110 may be implemented by connecting a digital camera to a video analysis device, wherein the video analysis device may be implemented by a computer, a chipset, or an embedded system platform. The digital camera is used for capturing video at all the time points. The video analysis device is for analyzing the captured video to acquire the object analysis results. The proprietary assigned number, position thereof, and characteristic information associated with each object are obtained through analysis. The video analysis device transmits the object analysis results and video sequences to the respective video analysis data integration unit 120.

To efficiently transmit the video sequences and the object analysis result, a video analysis data integration unit 120 compresses the received object analysis results and video sequences so as to generate compressed results. A video analysis data integration unit 120 then stores the compressed results in the video and analysis data database 130, wherein a compressed result contains both the object analysis results and the associated video sequences.

More specifically, the video analysis data integration unit 120 may utilize a video compression method (e.g., video coding method having high compression rate such as H.264) and perform data compression on video sequences for reducing the required transmission bandwidth. In addition, the video analysis data integration unit 120 inserts timing information into an object analysis result to verify the correspondence between the object analysis result and the associated video sequence. Then the video analysis data integration unit 120 performs data conversion (i.e., data compression method) accordingly, so as to reduce the amount of transmitted data.

To efficiently associate the video sequence and the object analysis result while reducing the amount of data to transmit, a video analysis data integration unit 120 not only inserts timing information into an object analysis result, but also utilizes a data hiding technique or a user data zone defined according to the video compression standard adopted so as to hide the object analysis result associated with each video sequence in the video information thereof. For instance, a video analysis data integration unit 120 may utilize a data hiding method and hide the bit data associated with a compressed object analysis result or processed video analysis data in the discrete cosine transform (DCT) parameters of the video information that makes up the video sequence.

The video and analysis data database 130 is used to store the compressed results transmitted by the video analysis data integration units 120. Since the compressed results contain information for the object analysis result and video sequence, the video sequences captured by the video capturing and analyzing units 110 in the surveillance regions as well as the pre- and post-temporal and spatial relations of the appeared objects are all stored in the video and analysis data database 130 so as to provide the information required by the multiple video content analysis unit 140 during the tracking analysis of a specific object.

In performing the tracking analysis of the specific object, the multiple video content analysis unit 140 reads the required information from the video and analysis data database 130 to analyze the relationships between the specific object to track and the objects in each video sequence captured by the video capturing and analyzing units 110. The complete historical trace information associated with the specific object to track can be linked to generate the historical video sequence of the specific object to track.

Specifically, the multiple video content analysis unit 140 obtains the necessary information required for the specific object analysis from the video and analysis data database 130 and further extracts the corresponding object analysis result in the embedded data. The correspondence is scored by analyzing the relationships between the specific object and the objects in the video sequences. The multiple video content analysis unit 140 further links the specific object appeared in each video sequence according to the analysis result to generate the object linking result having the highest correspondence score, wherein the object linking result with highest correspondence score is deemed to be the trace of the specific object. Next, the multiple video content analysis unit 140 provides the generated trace of the specific object for the user to view through the interactive user platform 150 and feeds the video information associated with the trace back to the video and analysis data database 130 to store.

To restate, the specific object crossing the surveillance regions of multiple video capturing and analyzing units 110 is recorded in the video of the video capturing and analyzing units 110. The multiple video content analysis unit 140 links the specific object crossing the video sequences in chronological order to form the trace of the specific object. The trace of the specific object enables a user to quickly view the time that the specific object had appeared and left each surveillance region through the interactive user platform 150. Consequently, the complete historical behavior information associated with the specific object across the multiple camera video surveillance environment may be discovered.

The interactive user platform 150 may provide the user with access to video associated with each surveillance region in the video and analysis data database 130 and direct synchronized playback control operations for each surveillance region. In addition, the interactive user platform 150 may perform specific event detection and specific object tracking operations based on user-configured surveillance conditions.

Moreover, as the conventional multiple camera video surveillance system is unable to guarantee the auto-generated trace image of the specific object to track being the correct object linking result, the interactive user platform 150 of the current embodiment further provides the user with the ability to correct the trace and have the final displayed trace be the correct linking result. As the interactive user platform 150 has trace correction capability, the multiple video content analysis unit 140 must provide not only the object linking result with the highest correspondence score but also other object linking results with relatively high correspondence scores. This allows the user to directly correct the trace of the specific object on the interactive user platform 150. The provided object linking results are ordered by the associated correspondence scores.

If the user has not corrected the trace through the interactive user platform 150, the multiple video content analysis unit 140 by default views the object linking result having the highest correspondence score as the correct object linking result and continues on with the after linking operations to generate the trace of the specific object. Conversely, if the user considers the object linking result with the highest correspondence score generated by the multiple video content analysis unit 140 as being incorrect then the user may select other object linking results through the interactive user platform 150, thereby correcting the linking errors and generating the correct trace.

The multiple video content analysis unit 140 loads the required compressed results for analysis from the video and analysis data database 130 based on the user-selected time from the interactive user platform 150. Next, the multiple video content analysis unit 140 analyzes the objects distributed in each video sequence through taking appearance, leaving, moving trace, object characteristics associated with the object, and even the historical information of date, time, and weather associated with the appearance of the object into account. The multiple video content analysis unit 140 may understand the occurrence probability associated with each object in the surveillance environment under all types of conditions as well as the possible moving trace distribution by analyzing the above information. Consequently, the correspondence analysis result associated with each object can be obtained. This corpus of traces is the complete trace of all objects in the overall surveillance environment.

The object analysis result obtained by a video capturing and analyzing unit 110 may be combined with the correspondence analysis result of the multiple video content analysis unit 140. When displaying a video sequence, each object may be displayed with object information thereof including the assigned number and position. The multiple video content analysis unit 140 generates a correspondence analysis result by integrating the assigned number, occurrence probability, and surveillance environment position associated with various potentially matching objects and embeds the correspondence analysis result into the video information. Such that the identical object distributed in the video sequences captured by different video capturing and analyzing units 110 may be linked to obtain the complete trace associated with all the objects in the overall surveillance environment. The multiple video content analysis unit 140 then feeds back the video information having the embedded analysis result to the video and analysis data database 130 to store and for fulfilling the display needs of the interactive user platform 150.

The multiple video content analysis unit 140 may utilize object information including the spatial, temporal, and object characteristics associated with the object before and after the selected time in consideration to link objects across video sequences. The aforementioned object information may be divided into three levels according to their difficulty to obtain: order of appearance, object characteristics and historical information.

The first level of object information contains the position and velocity of the object. The multiple video content analysis unit 140 may predict the next possible occurrence position of an object based on the object's position of disappearance and moving velocity at the time. Specifically, the multiple video content analysis unit 140 may use the information of object appearance, disappearance and the user-configured spatial placement of the video capturing and analyzing unit 110 along with graph theory to establish a probability distribution function (PDF) associated with each object. The multiple video content analysis unit 140 then may utilize the probability distribution function for correspondence evaluation to link the identical objects across video sequences.

For example, in a mass rapid transit (MRT) station surveillance environment, a person that has just entered the MRT station is next most likely to be recorded in the surveillance region near the entrance to the platforms, e.g., the turnstiles. As the person has not yet passed through a turnstile, the probability that the person next appears on the waiting platform is zero. In this manner, the multiple video content analysis unit 140 may analyze the probability distribution function of a person's next occurrence in the surveillance region of each video capturing and analyzing unit 110 when a person last appeared at certain position. In other words, the multiple video content analysis unit 140 may utilize a probability distribution function to link an object that appeared in multiple surveillance regions to obtain the trace information and historical video footage associated with the identical object.

The second level of object information consists of the object characteristics. The multiple video content analysis unit 140 may compare objects appearing in different surveillance regions at different times by their object characteristics and thereby identify cross-camera objects in the video sequences. More specifically, the multiple video content analysis unit 140 may obtain a potential matching object for an object linking operation according to a probability distribution function while utilizing the analyzed object's position and velocity to filter the potential object candidates having low probability and further filter potential matching objects by comparing object characteristics (e.g., color and shape information) associated with the objects. Both the probability distribution function and the object characteristic information are taken into consideration when performing the correspondence analysis so as to obtain a more optimal correspondence evaluation.

Taking the MRT station surveillance environment as an example again, the multiple video content analysis unit 140 can analyze the person leaving the MRT gateway by the associated leaving velocity and heading direction as well as the relative position in the surveillance image. The multiple video content analysis unit 140 further analyzes and predicts which video sequences from video capturing and analyzing units 110 the person would next appear in and compares the characteristics (e.g. color) associated with the person in the video sequences captured by these video capturing and analyzing units 110 to create the trace of the person across video sequences.

The third level of the object information is historical information. The multiple video content analysis unit 140 may use the past statistical information to analyze all possible traces of each object and compute the probability distribution of each trace so as to predict the possible positions of objects seen in future analyses. More specifically, the multiple video content analysis unit 140 may perform data analysis and statistics computation on all the historical information of the surveillance environment and the analyzed object information thereof to obtain specific statistical information corresponding to the surveillance environment. In addition, the statistical information may further be categorized according to different conditions such as time and environmental parameters. Hence, the multiple video content analysis unit 140 may characterize the historical behavior trace of an object in the surveillance environment under the specific time and environmental parameters. Alternatively, taking the probability distribution function, object characteristic information and historical object trace information into consideration when performing the correspondence analysis to obtain a more optimal correspondence evaluation. Referring again to the MRT station surveillance example, once a specific length of video has been accumulated, the multiple video content analysis unit 140 may perform statistical analysis on the video information of a certain MRT station to obtain the historical behavior trace of that station. For example, it may discover that people wearing student uniforms just before and just after school hours are most likely to pass through an entrance/exit, take the upper level pathway of the MRT and then leave the MRT station without entering the MRT platform nor riding the MRT. In contrast, just before and just after working hours, most people entering the MRT station pass through an entrance/exit of the MRT station, enter the platform and ride the MRT.

Hence, the multiple video content analysis unit 140 may obtain the statistical information of people entering and leaving the MRT station to predict the travel direction of the people appearing in the surveillance region. For instance, when a person who wears a student uniform appears just before and just after school hours, the probability associated with that person passing through the upper level pathway and leaving the MRT station is higher than the probability of that person entering the platform and riding the MRT.

Moreover, when linking objects that appear in video sequences of the video capturing and analyzing units 110, the multiple video content analysis unit 140 may obtain the correspondence evaluation topology mapping associated with the object trace distribution. Each node in the correspondence scoring topology mapping indicates the potential tracking object, hence by linking all the potential matching objects with highest correspondence score, the trace of the object may be obtained.

Figures 1, 8:
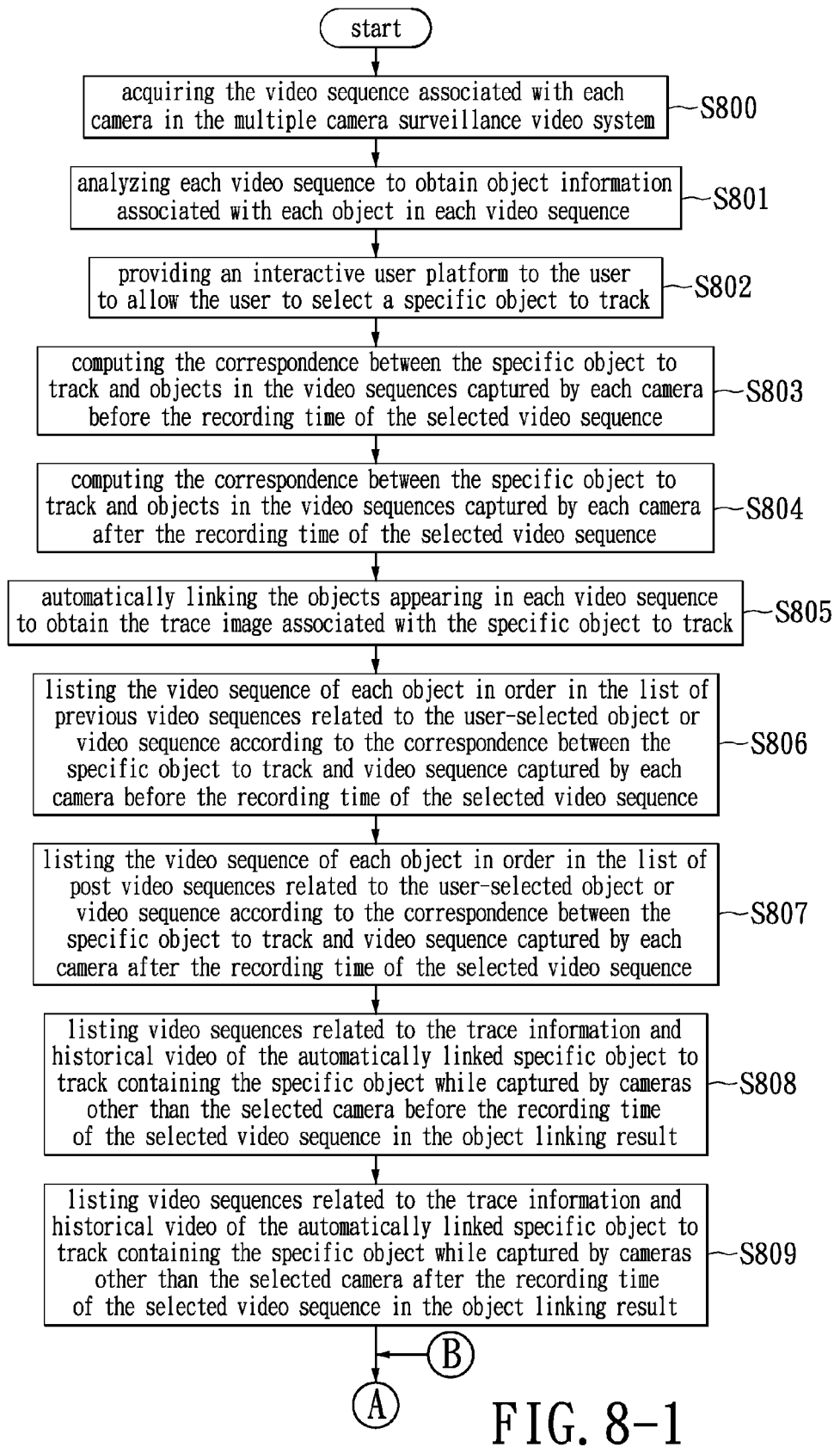
Figures 2, 8:
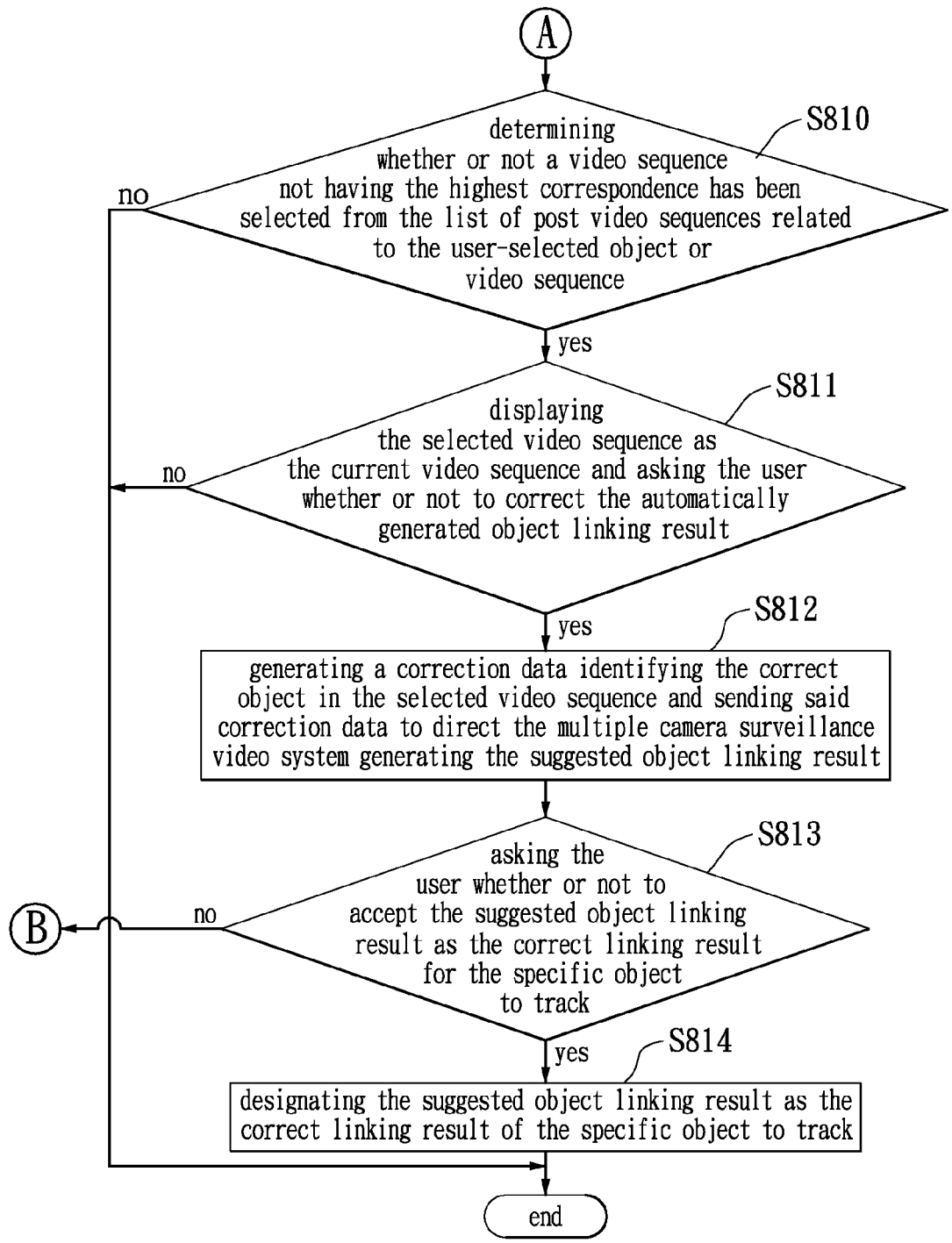

FIG. 2 shows a conceptual diagram illustrating a correction method for linking objects in video sequences on an interface associated with an interactive user platform provided in accordance with an embodiment of the present disclosure. The interface of the interactive user platform includes a surveillance environment window 210, a camera listing window 220, at least an object surveillance window and a multiple camera video sequence window 240. The correction method for linking objects in video sequences may be implemented by software, and the interface of the interactive user platform may be implemented on all kinds of operating system platforms. However, the implementations of the correction method for linking objects across video sequences and the interface of the interactive user platform are not limited thereto.

The surveillance environment window 210 includes a conceptual diagram of environment 211 for displaying overall surveillance environments, wherein the conceptual diagram of environment 211 may provide the user with understanding over the geographical characteristics (e.g., hallway position and room layout information), the distribution status of the video capturing and analyzing units 110 (i.e., deployed locations) and the trace of the specific object to track in the surveillance environment. The user may configure a geographical environment diagram, a building schematic diagram, a surveillance equipment distribution diagram or the superposition thereof as the conceptual diagram of environment 211. In addition, the user may also use three-dimensional computer graphics to display the conceptual diagram of environment 211.

The surveillance environment window 210 further includes the playback control unit 212 and time-axis control element 213. The playback control unit 212 is used for effectively controlling the playback operations (forward or rewind) of video information during tracking, displaying and correcting operations of the post historical trace. The time-axis control element 213 may be used for controlling the playback operations of the video information. The playback control unit 212 may link the playback control of all the video information on the user interface to synchronously play the video information captured by each video capturing and analyzing unit 110 in the multiple camera video surveillance system 100 on the interface of the interactive user platform.

The camera listing window 220 is used for displaying the assigned number of all cameras (i.e., cameras used by video capturing and analyzing units 110) in the system and the relationship among the placements of the cameras in the surveillance environment. Each camera may be displayed and distinguished using a specific identification method, for instance, by using different color codes to distinguish each camera. The content of the camera listing window 220 and the content of the surveillance environment window 210 may be simultaneously displayed. When the user selects one camera from the camera listing window 220, the user-selected camera is immediately highlighted in the surveillance environment window 210 and the camera listing window 220 with a prominent color. On the other hand, the unselected cameras are then highlighted in the surveillance environment window 210 and the camera listing window 220 with a dull color.

The display region 231 of the object surveillance window 230 is used for displaying the user-selected video sequence captured by the camera. The object surveillance window 230 may continuously display the selected specific object to track, even if the selected object has left the surveillance region of the initially selected camera. The object surveillance window 230 allows the user to perform the object linking results correction (i.e., correcting the trace of the object to track) so as to correct the mislinked object trace created by the multiple video content analysis unit 140.

More specifically, the user may use object surveillance window 230 to navigate through the object linking result (i.e., panel 234 holds the trace history before the selected time, panel 231 holds the trace at the selected time, and panel 235 holds the trace after the selected time) to the point of a linking error and then select from the lists of potentially matching objects (i.e., panel 232 lists potentially matching objects prior to or at the selected time, panel 233 lists potentially matching objects after the selected time) to correct the error. In this manner, the user prevents the multiple video content analysis unit 140 from mislinking the specific object across the video sequences. In order for the user to obtain a clear understanding over the complete status of the potential matching objects, the presentation method of previous and post related potentially matching objects or video sequences may include video sequence playback, object screenshots, or an object trace image which is generated via superposition method. The video sequence playback plays back the recorded video sequence of the potentially matching objects in the surveillance region associated with the corresponding camera. An object screenshot or the screenshot of the complete object is the image captured when the object is completely displayed in the surveillance region of the associated camera. An object trace image is a specially processed single image generated using image processing and superposition showing the movement of the potentially matching object across a camera surveillance region.

The multiple camera video sequence window 240 is used for displaying the real-time video captured by the user-selected cameras or for playback of historical video information from the user-selected cameras via the recordings stored in the video and analysis data database 130. The multiple camera video sequence window 240 may be implemented either by integrating numerous video playback windows or by a single floating window displaying the video captured by multiple cameras.

When the user performs real-time monitoring over the surveillance environment on the interactive user platform 150, in which the interface of the interactive user platform 150 includes the surveillance environment window 210, the camera listing window 220, and the multiple camera video sequence window 240. The multiple camera video sequence window 240 displays multiple or even all of the real-time video sequences, whereby the displayed video sequences may be obtained from the video and analysis data database 130. The video sequence of each camera may each be displayed by an independent child window 241 and the size and position of each independent child window 241 may be configured by the user. In addition, the video of each camera may be displayed in any sub-screen of the split-screen 241 and the arrangement method thereof may be configured by the user.

Figure 3A:
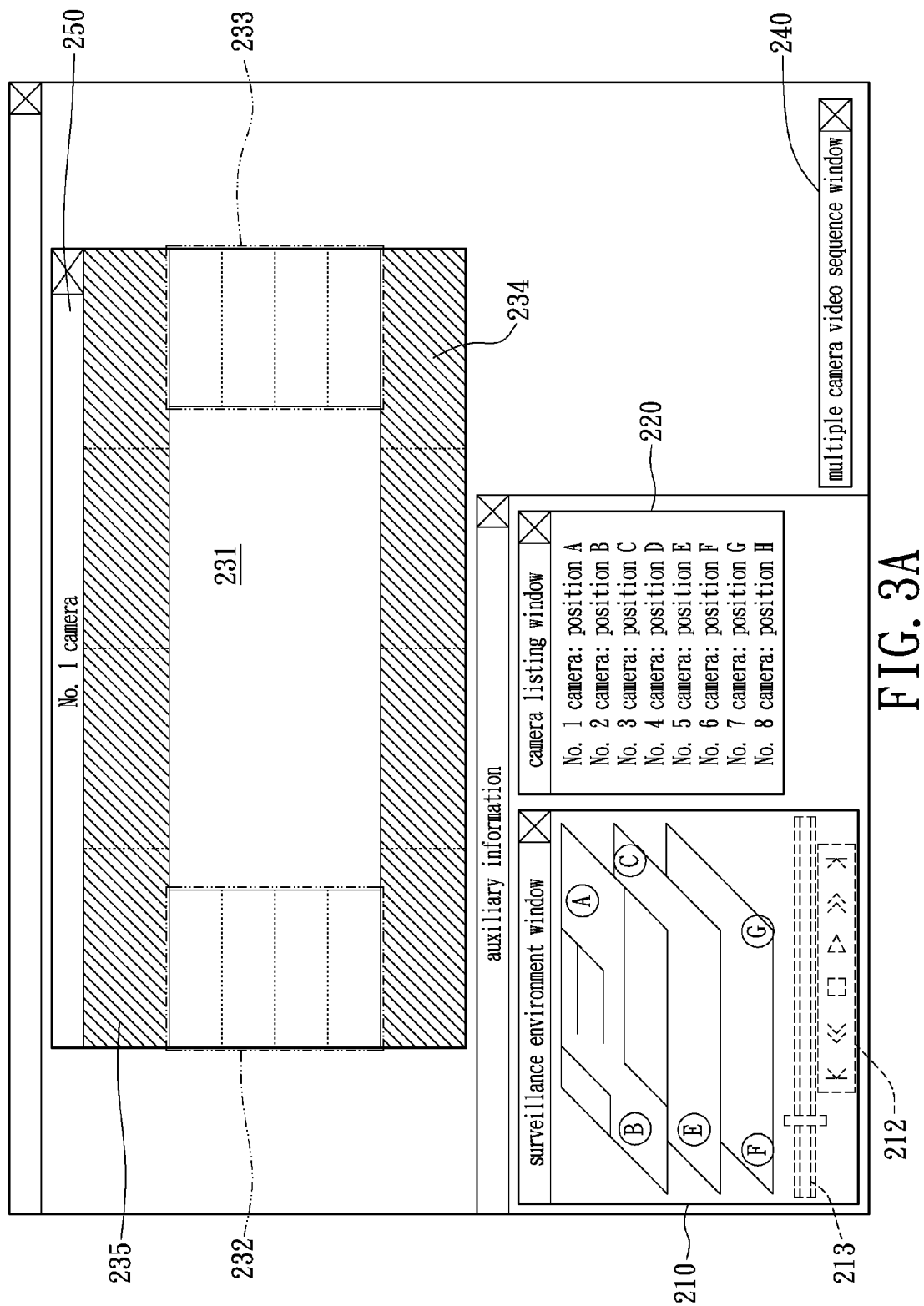
FIG. 3A is a conceptual diagram illustrating an interface associated with an interactive user platform allowing a user to select a camera for real-time video surveillance in accordance with an exemplary embodiment of the present disclosure.

FIG. 3A shows a conceptual diagram illustrating an interface associated with an interactive user platform that allows a user to select a camera for real-time video surveillance in accordance with an embodiment of the present disclosure. When the user selects one of the cameras from the multiple camera video sequence window 240, camera locations listed in the surveillance environment window 210, or the camera listing window 220, a video surveillance window for the selected camera 250 is generated. At the same time, the selected camera is highlighted with a prominent color (e.g., red) in the surveillance environment window 210 and the camera listing window 220 while the unselected cameras are highlighted with a dull color (e.g., dark gray). Furthermore, the multiple camera video sequence window 240 is minimized to the bottom edge of the interface screen or minimized and arranged at the edge of the interface screen. The video associated with other cameras are displayed using miniaturized screens.

The real-time video sequence captured by the selected camera is shown in display region 231 of the video surveillance window for the selected camera 250. The list of previous video sequences related to the user-selected object or video sequence 232 displays video sequences captured a few seconds ago by cameras deployed nearby the user-selected camera. The list of post video sequences related to the user-selected object or video sequence 233 displays the video sequences captured at this instant by cameras deployed nearby the user-selected camera. Moreover, since the user has not yet selected a specific object to track, the object linking result before the selected time 234 and the object linking result after the selected time 235 do not display any content and may either be highlighted with dark colors or not appear at all in the video surveillance window for the selected camera 250.

For example, when the user selects the No. 1 camera, the video surveillance window for the selected camera 250 is generated for camera No. 1. At the same time, the No. 1 camera listed in the camera listing window 220 is highlighted with red while the rest of the cameras are highlighted with dark gray. The position A located in the conceptual diagram of environment is marked by a red box, while other positions (i.e. position B~position H) are marked by semi-transparent dark gray boxes. Since there is no need to use the playback control unit 212 and the time-axis control element 213 in real-time surveillance, the playback control unit 212 and time-axis control element 213 may be displayed semi-transparently. Moreover, the multiple camera video sequence window 240 may be minimized to the bottom edge of the of the interface screen.

Figure 3B:
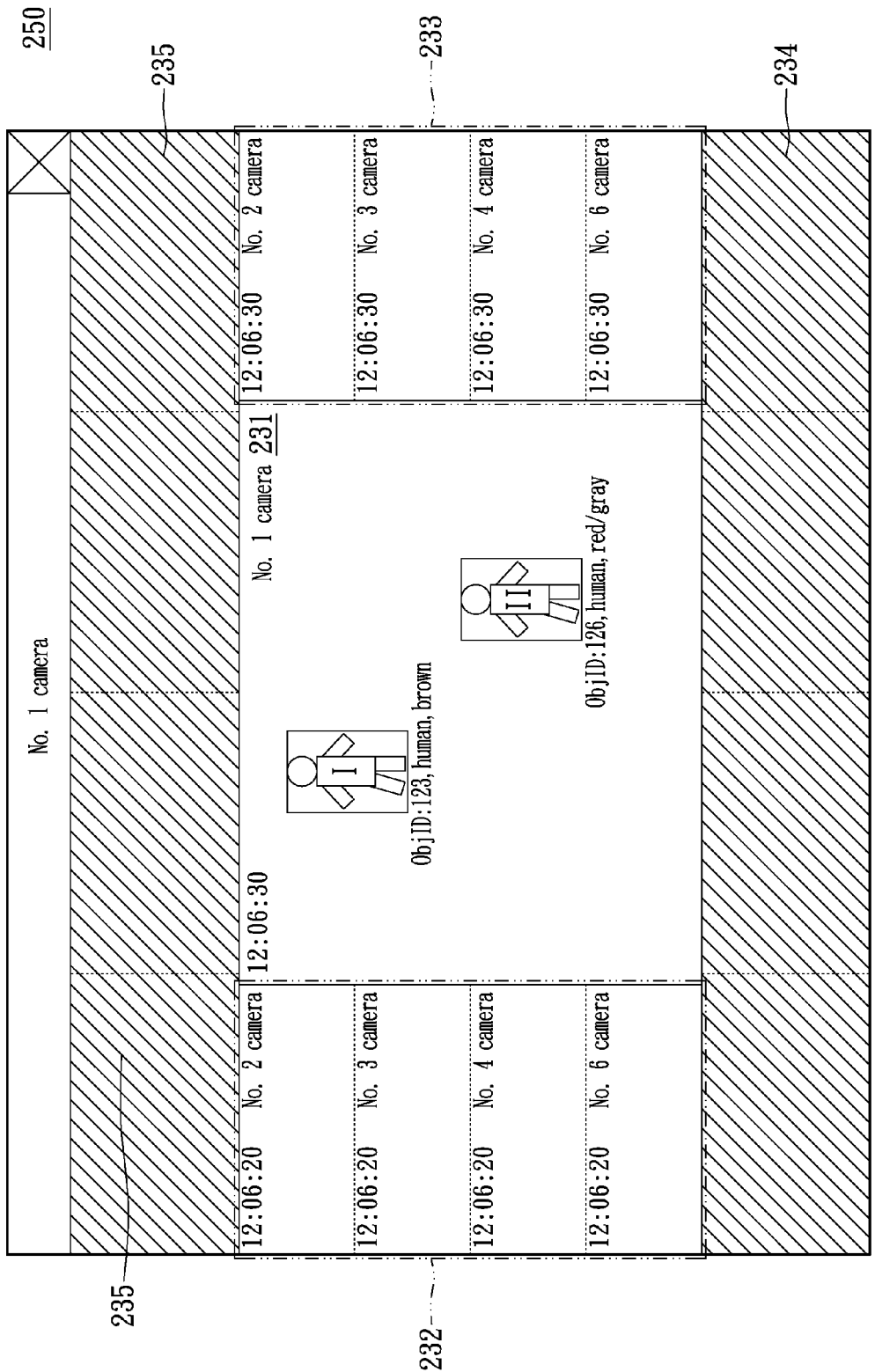
FIG. 3B is a detailed diagram illustrating a video surveillance window of a specific camera in accordance with an exemplary embodiment of the present disclosure.

FIG. 3B is a detailed diagram illustrating a video surveillance window of a specific camera in accordance with an exemplary embodiment of the present disclosure. As previously described, since the user has not yet selected a specific object to track, the object linking result before the selected time 234 and the object linking result after the selected time 235 do not need to display any content and therefore both may be highlighted with dark colors.

The multiple camera video surveillance system 100 not only displays the video sequence captured by the user-selected camera in the display region 231, but also shows a label with the number assigned to the user-selected camera on the upper edge of the video surveillance window for the selected camera 250. For instance, the No. 1 camera is labeled on the upper edge of the video surveillance window for the selected camera 250. Additionally, the multiple camera video surveillance system 100 may mark the recording time on the display region 231.

Furthermore, the multiple camera video surveillance system 100 may extract object information (which includes, but is not limited to, the position of the object, the assigned object ID, and the object characteristics) from the corresponding video sequence and display the object information around the corresponding object in the display region 231. The position of the object may be boxed and with object information placed around it to describe the object (e.g., object ID with highest probability, object type, color characteristics, spatial information presented in the surveillance environment, but the current embodiment is not limited to the example provide herein).

For example, in FIG. 3B, the position of person I is boxed and the associated object information is placed nearby, wherein the assigned object ID, object type, and color characteristics of person I are 123, human, and brown, respectively. Similarly, the position of person II is boxed and the associated object information is placed nearby, wherein the object ID, object type, and color characteristics of person II are 126, human, and red/gray, respectively.

The list of previous video sequences related to the user-selected object or video sequence 232 not only shows the video sequences captured a few seconds ago by cameras deployed nearby the user-selected camera but also labels each with the associated recording time and the assigned number of the camera. Similarly, the list of post video sequences related to the user-selected object or video sequence 233 shows the video sequences captured at this instant by cameras deployed nearby the user-selected camera and also labels each with the associated recording time and the number assigned to the camera. The video sequences listed in the list of previous video sequences related to the user-selected object or video sequence 232 and the list of post video sequences related to the user-selected object or video sequence 233 are ordered based on the assigned number of the cameras or the respective distance from the user-selected camera.

As shown in FIG. 3B, the video sequences listed in the list of previous video sequences related to the user-selected object or video sequence 232 and the list of post video sequences related to the user-selected object or video sequence 233 are ordered based on the assigned number of the cameras. The video sequences captured respectively by the No. 2 camera, No. 3 camera, No. 4 camera, and No. 6 camera deployed nearby the No. 1 camera are ordered correspondingly. As shown in FIG. 3B, the display region 231 displays the recording time associated with the real-time video captured by the No. 1 camera to be 12:06:30. As such, the recording time associated with the video sequences respectively captured by the No. 2 camera, No. 3 camera, No. 4 camera, and No. 6 camera shown in the list of previous video sequences related to the user-selected object or video sequence 232 must be earlier than 12:06:30, e.g., 12:06:20. The recording time associated with the video sequences respectively captured by the No. 2 camera, No. 3 camera, No. 4 camera, and No. 6 camera shown in the list of post video sequences related to the user-selected object or video sequence 233 should be 12:06:30.

Figure 4A:
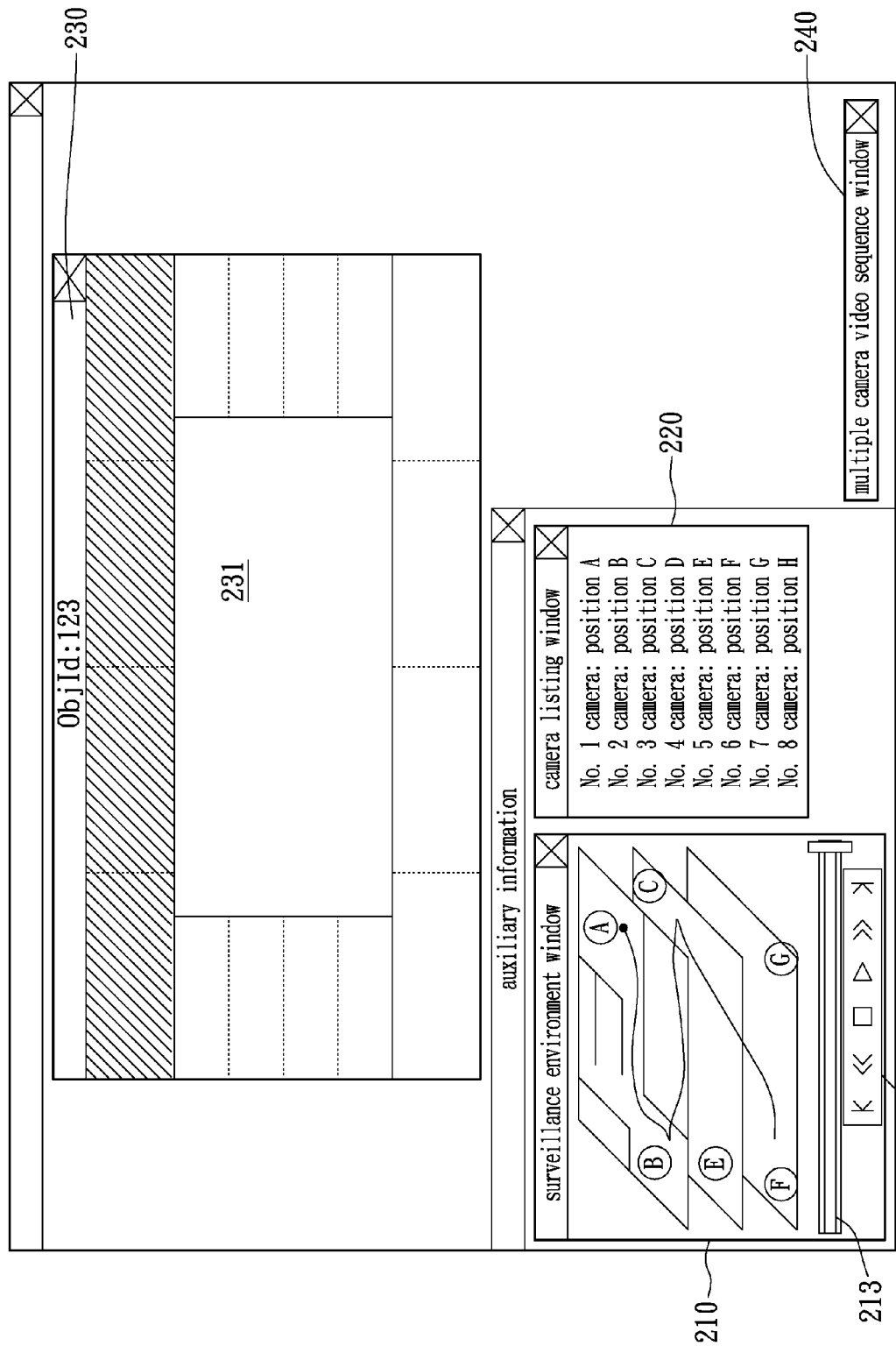
FIG. 4A is a conceptual diagram illustrating an interface associated with an interactive user platform allowing a user to select a specific object to track for real-time video surveillance in accordance with an exemplary embodiment of the present disclosure.

FIG. 4A shows a conceptual diagram depicting an interface associated with the interactive user platform that allows a user to select a specific object to track for real-time surveillance in accordance with an exemplary embodiment of the present disclosure. When the user selects a specific object to track, the video surveillance window for the selected camera 250 may transform into object surveillance window 230. For instance, after the user selects the object with object ID "123", transformation may occur on the interface of the interactive user platform 150, i.e., the video surveillance window for the selected camera 250 may transform into object surveillance window 230. The interface may provide the user with control over video sequences associated with the selected specific object to track at each time point. Consequently, the playback control unit 212 and the time-axis control element 213 no longer remain semi-transparent, instead each displays as active controls.

In the surveillance environment window 210, position A may be marked by a red box while other positions (i.e., position B~position H) are marked by dark gray semi-transparent boxes. Meanwhile, the surveillance environment window 210 displays the historical trace of the selected specific object to track. The historical trace of the specific object to track may be obtained through a filtering method. More specifically, the object information associated with object ID "123" is first acquired from the video and analysis data database 130. Next, the historical trace of the specific object to track is generated by linking the spatial information in correspondence with time and the objects presented in the surveillance environment. The interactive user platform 150 may temporarily store object information associated with all the objects in the presently viewed video sequence so as to avoid performing data acquisition and analysis multiple times.

Figure 4B:
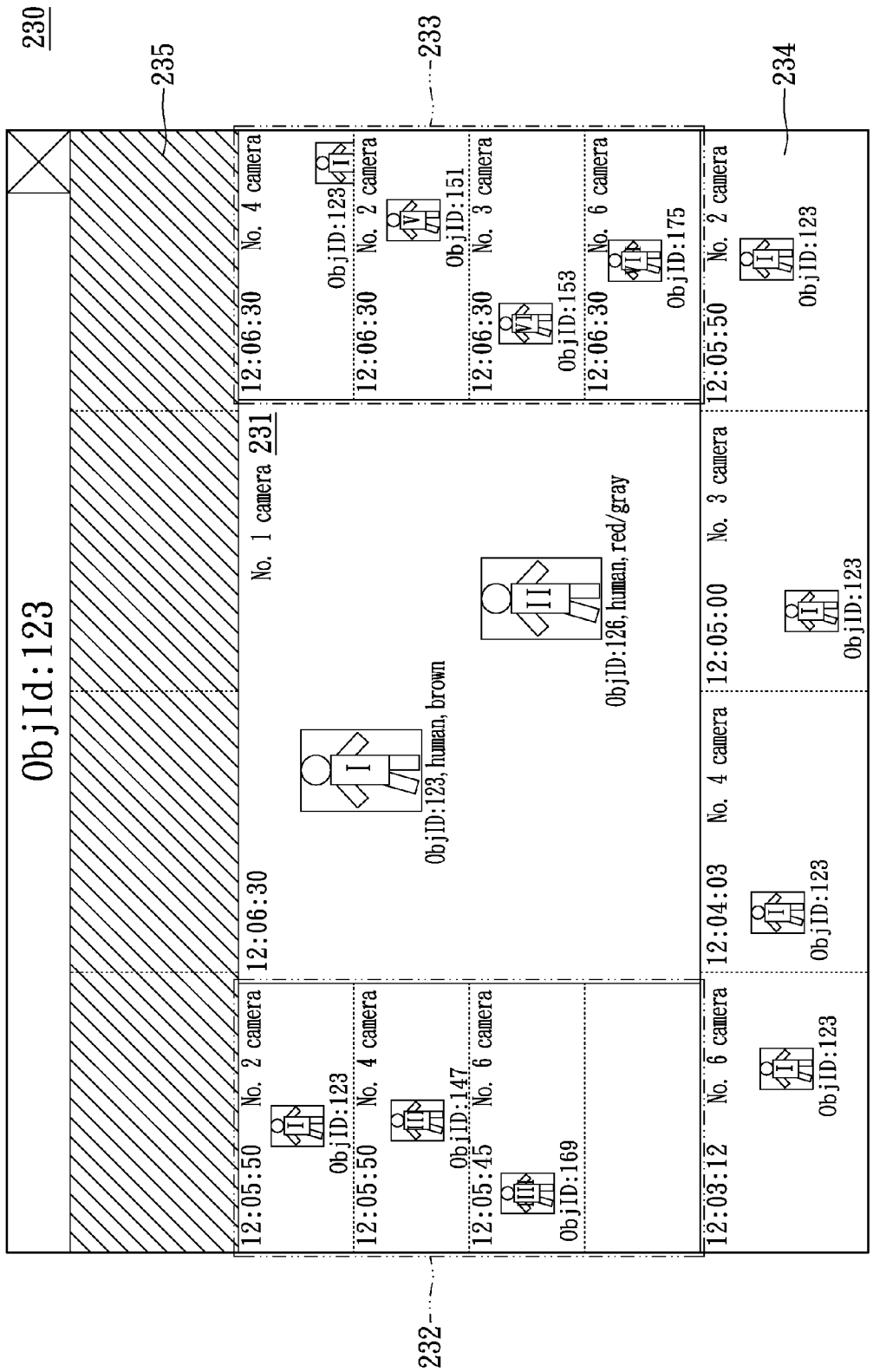
FIG. 4B is a detailed diagram illustrating an object surveillance window in accordance with an exemplary embodiment of the present disclosure.

FIG. 4B shows a detailed diagram illustrating an object surveillance window in accordance with an embodiment of the present disclosure. FIG. 4B is used to illustrate the object surveillance window 230 in detail. The display region 231, located in the center of the object surveillance window 230, is used for displaying the selected video sequence, and the display region 231 further shows the camera number, the recording time, and the object information of each object in the selected video sequence. For instance, the selected video sequence currently shown in FIG. 4B was captured by the No. 1 camera, and the display region 231 thereby shows the label of No. 1 camera.

In addition, the specific object to track selected by the user may be boxed with a prominent color (e.g., red) while other objects may be boxed by dotted-line borders with dull color. The list of previous video sequences related to the user-selected object or video sequence 232 may hereby be used for displaying video sequences of potentially matching objects appearing before the selected time and captured by cameras other than the camera that captured the selected video sequence shown in display region 231. These video sequences containing potentially matching objects may be arranged in descending order of the object correspondence probability in the list of previous video sequences related to the user-selected object or video sequence 232. The list of post video sequences related to the user-selected object or video sequence 233 may hereby be used for displaying video sequences of potentially matching objects appearing a couple seconds after the selected time and captured by cameras other than the camera that captured the selected video sequence shown in display region 231. The video sequences of potentially matching objects may be arranged in descending order of object correspondence probability in the list of post video sequences related to the user-selected object or video sequence 233.

For example, in the list of previous video sequences related to the user-selected object or video sequence 232 of FIG. 4B, the object correspondence probability arrangement of potentially matching objects corresponding to object ID "123" in the selected video sequence may be the object with object ID "123" appearing in the video sequence of the No. 2 camera, the object with object ID "147" appearing in the video sequence of the No. 4 camera and the object with object ID "169" appearing in the video sequence of the No. 6 camera. The multiple video content analysis unit 140 in the instant embodiment may believe that the object with object ID "123" appeared in the video sequence captured by the No. 2 camera and the object with object ID "123" in the selected video sequence are identical. Consequently, the object with object ID "123" appearing in the video sequence captured by the No. 2 camera may be boxed with a prominent color while the object with object ID "147" appearing in the video sequence of the No. 4 camera and the object with object ID "169" appearing in the video sequence of the No. 6 camera are boxed with dotted-line borders and a dull color.

Moreover, a video sequence in the list of previous video sequences related to the user-selected object or video sequence 232 may display an overall video sequence of a potentially matching object presented by the camera, a part of the video sequence of a potentially matching object captured by the camera in the surveillance region or an image resulting from superposition of the trace associated with a potentially matching object appearing in the surveillance region. The method adopted by the list of previous video sequences related to the user-selected object or video sequence 232 for displaying the video sequence of a potentially matching object should not be used to limit the present disclosure.

Furthermore, if a video sequence in the list of post video sequences related to the user-selected object or video sequence 233 has an object that is identical to the selected specific object to track then the video sequence may be ordered at the highest position. For instance, since the surveillance region of the No. 4 camera overlaps the surveillance region of the No. 1 camera, consequently, the specific object to track (e.g., object with object ID "123") may appear simultaneously in the video sequences captured by the No. 1 camera and the No. 4 camera. As the video sequence captured by the No. 4 camera contains the specific object to track, the video sequence captured by the No. 4 camera is listed first in the list of post video sequences related to the user-selected object or video sequence 233. At the same time, the specific object to track in the video sequence captured by the No. 4 camera is boxed via a prominent border.

The object linking result before the selected time 234 is used for displaying a video sequence of the selected object that appears in the surveillance regions monitored by cameras wherein the video sequence was captured before the selected time. The video sequences are arranged and displayed in chronological order. The video sequences in the object linking result before the selected time 234 may display the complete video sequence of the potentially matching object captured by the camera, a part of the video sequence of the potentially matching object captured by the camera or an image resulting from superposition of the trace associated with the potentially matching object appearing in the surveillance region. The described methods for displaying a video sequence of a potentially matching object adopted by the object linking result before the selected time 234 should not be used to limit the current disclosure. As FIG. 4B shows the object surveillance window 230 under real-time surveillance and the object linking result after the selected time 235 is incapable of knowing the future trace associated with the selected specific object to track, therefore, the object linking result after the selected time 235 may either be displayed in dark color or not appear in the object surveillance window 230 at all.

If the user wishes to view the video sequence of the specific object to track before the selected time, the user may either pull the time-axis control element 213 or operate the playback control unit 212 to view the specific object to track in the selected video sequence in the object surveillance window 230. In other words, the interactive user platform 150 may further provide post review functionality for the specific object to track.

When the user expects to review a video sequence of a specific period of time through the interactive user platform 150, the interface displayed on the interactive user platform 150 includes the surveillance environment window 210, the camera listing window 220, the playback control unit 212, the time-axis control element 213, and the multiple camera video sequence window 240. The multiple camera video sequence window 240 displays many or even all of the video sequences of the specific period configured by the user and these video sequences may be obtained from the video and analysis data database 130. Each video sequence may be presented in an independent child window or in any sub-screen of the split-screen. As described previously, the size and position of the independent child window may be configured by the user and moreover, the arrangement of each sub-screen of the split screen may also be configured by the user. The user may control playback of selected video sequences via the playback control unit 212 and the time-axis control element 213. If multiple video sequences are selected, they can be played synchronously. The user may thereby view all video sequences necessary to perform surveillance.

Figure 5A:
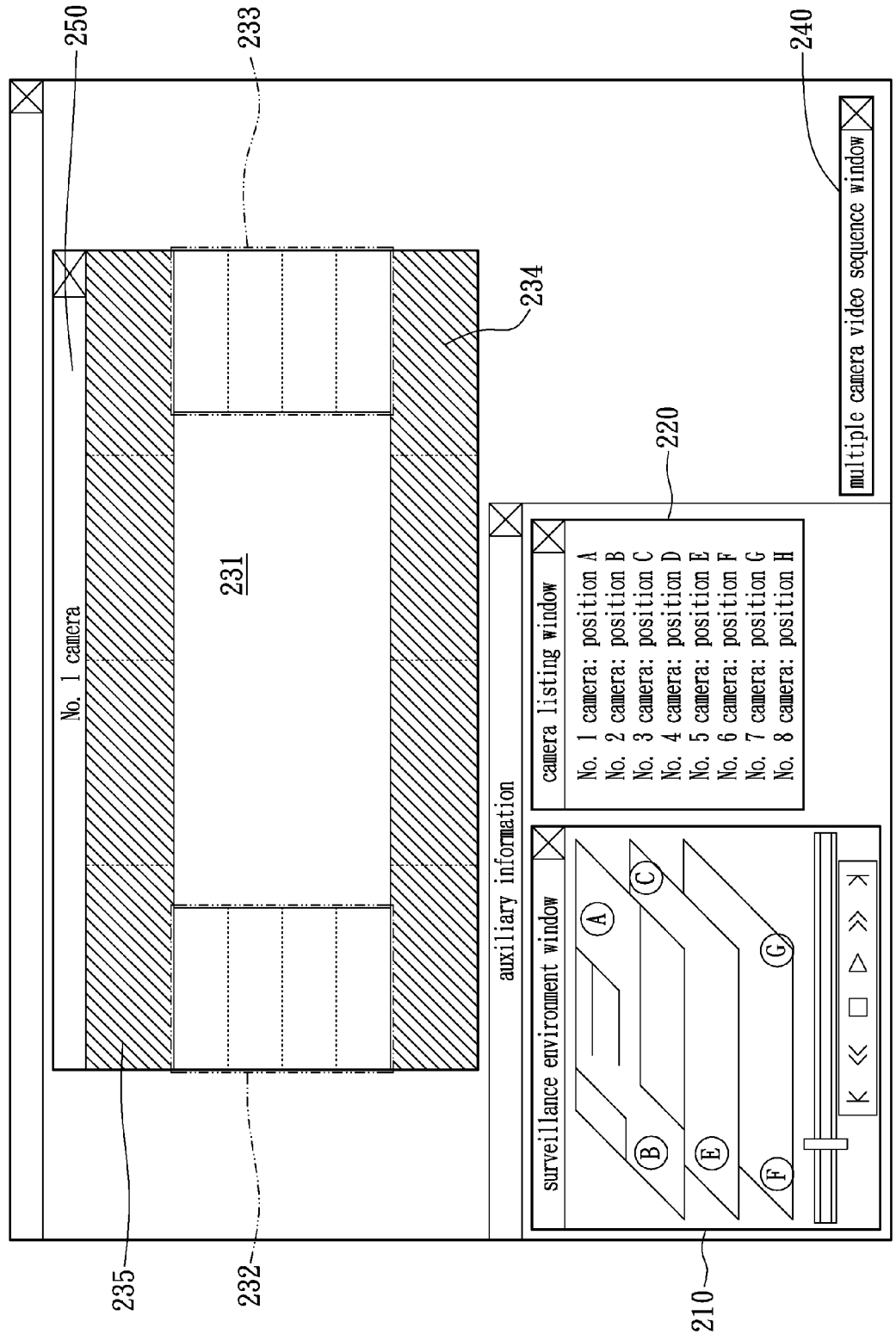
FIG. 5A is a conceptual diagram illustrating an interface associated with an interactive user platform allowing a user to select a specific camera for the post review process in accordance with an exemplary embodiment of the present disclosure.
Figure 5B:
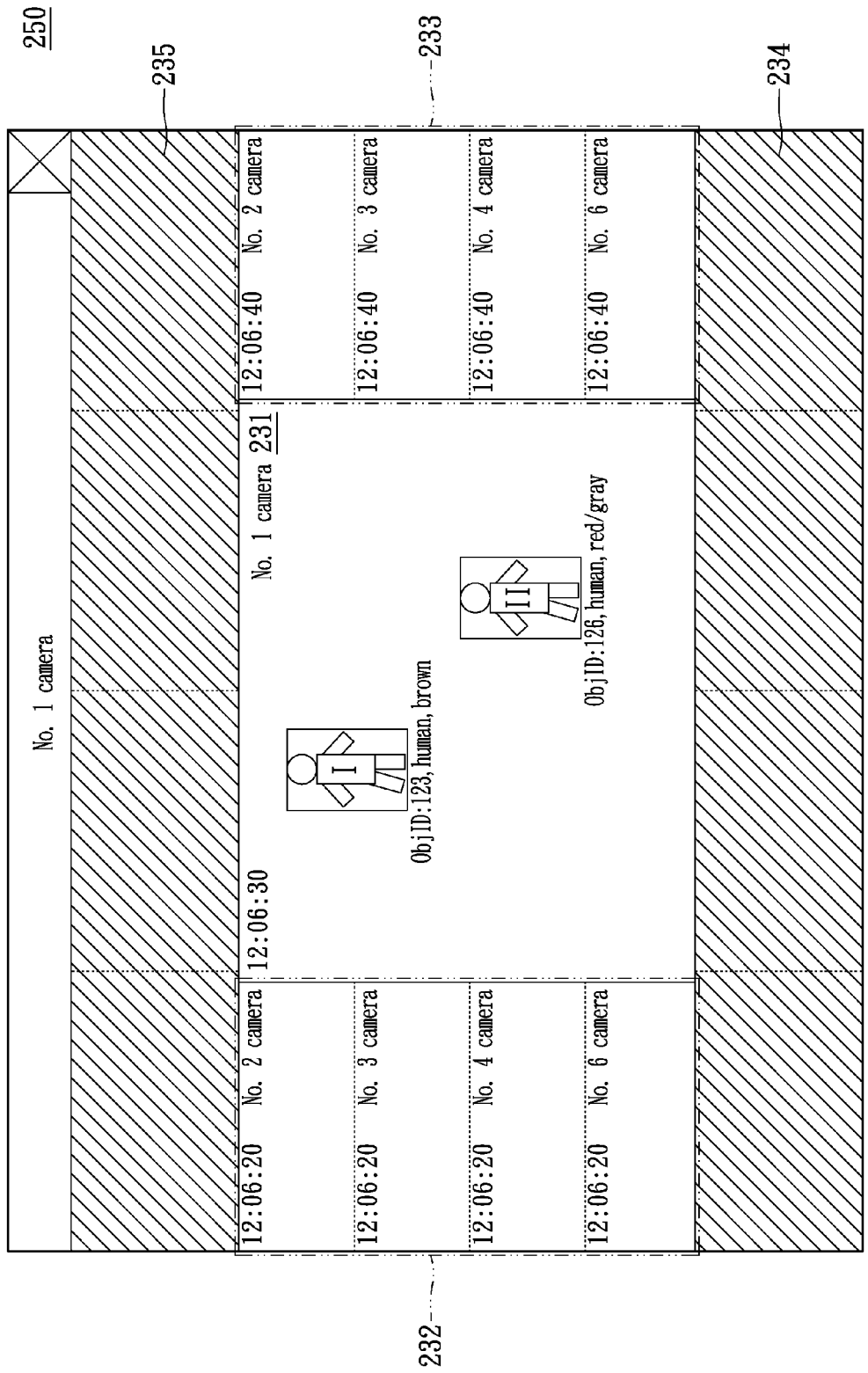
FIG. 5B is a detailed diagram illustrating a video surveillance window of a specific camera provided in accordance with an exemplary embodiment of the present disclosure.

Please refer to FIG. 5A and FIG. 5B. FIG. 5A is a conceptual diagram illustrating an interface associated with an interactive user platform allowing a user to select a specific camera for the post review process in accordance with an embodiment of the present disclosure. FIG. 5B provides a detailed diagram illustrating a video surveillance window of a specific camera provided in accordance with an embodiment of the present disclosure, wherein the detailed diagram of FIG. 5B corresponds to the video surveillance window for post reviewing the user-selected camera.

When the user selects a camera from either the camera listing window 220, the deployed locations shown in the surveillance environment window 210, or the multiple camera video sequence window 240, the video surveillance window for the selected camera 250 is immediately generated. At the same time, the surveillance environment window 210 and the camera listing window 220 may highlight the selected camera with a prominent color (e.g., red) while the unselected cameras are highlighted by a dull color (e.g., dark gray). Moreover, the multiple camera video sequence window 240 may minimized to the bottom edge of the interface screen; or equivalently the multiple camera video sequence window 240 may be minimized and placed at the edge of the interface screen while video from other cameras may be displayed using miniaturized screens.

The current playback video sequence of the selected camera may be displayed on the display region 231 located in the video surveillance window for the selected camera 250. In addition, the list of previous video sequences related to the user-selected object or video sequence 232 is configured to display the video sequences recorded a few seconds before the selected video sequence by cameras deployed nearby the user-selected camera. The list of post video sequences related to the user-selected object or video sequence 233 is configured to display the video sequences recorded a few seconds after the selected video sequence by cameras deployed nearby the user-selected camera. As the user has not yet selected the specific object to track, the object linking result before the selected time 234 and the object linking result after the selected time 235 do not need to display any content, and may either be highlighted with dark colors or not appear in the video surveillance window for the selected camera 250 at all.

For instance, the video surveillance window for the selected camera 250 that corresponds to the No. 1 camera is immediately generated when the user selects the No. 1 camera. Meanwhile, the No. 1 camera listed in the camera listing window 220 may be highlighted with red color while the rest of the cameras are highlighted with dark gray color. The position A located in the conceptual diagram of the surveillance environment is marked by a red box, while other positions (i.e. positions B to H) are marked by semi-transparent dark gray boxes. Additionally, the multiple camera video sequence window 240 may be minimized to the bottom edge of the of the interface screen.

Figure 6A:
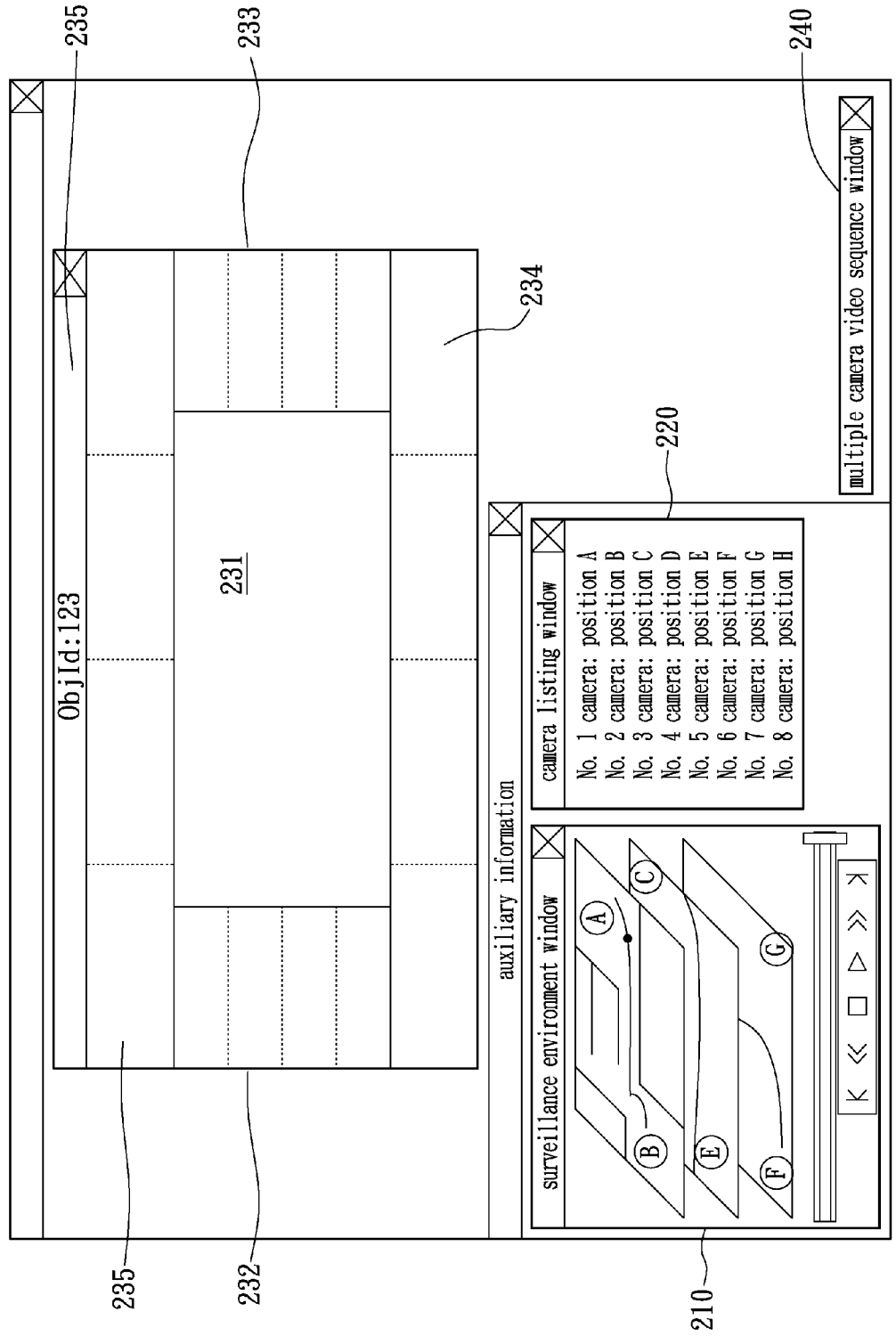
FIG. 6A is a conceptual diagram illustrating an interface associated with an interactive user platform allowing a user to select a specific object to track for the post review process in accordance with an exemplary embodiment of the present disclosure.

FIG. 6A is a conceptual diagram depicting an interface associated with the interactive user platform that allows a user to select a specific object to track for the post review process in accordance with an exemplary embodiment of the present disclosure. When the user selects a specific object to track, the video surveillance window for the selected camera 250 transforms into the object surveillance window 230. For instance, after the user selects the object with object ID "123", the interface of the interactive user platform 150 may change, i.e., the video surveillance window for the selected camera 250 transforms to the object surveillance window 230 for the object with object ID "123".

In the surveillance environment window 210, position A may be marked by a red box while other positions (i.e., positions B to H) are marked by a dark gray semi-transparent box. Meanwhile, the surveillance environment window 210 displays the historical trace of the specific object to track, wherein the dot displayed in the surveillance environment window 210 indicates the position of the object in the surveillance environment. Hence, the dot may move according to the position of the object in correspondence to the playback time. The dot may flash to highlight the position of the specific object to track in the surveillance environment. The overall trace of the specific object to track can be obtained via object linking.

Figure 6B:
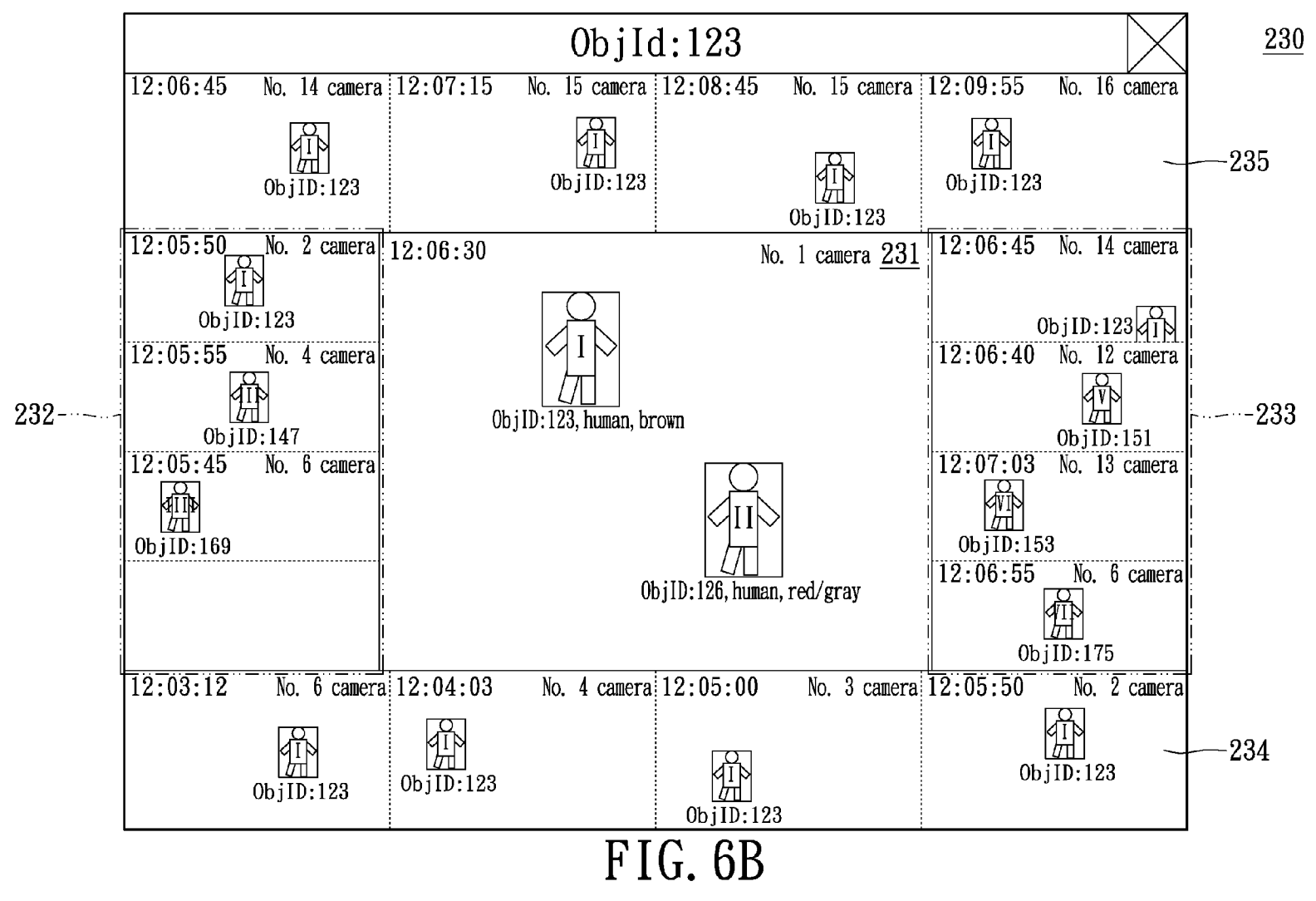

FIG. 6B shows a detailed diagram depicting an object surveillance window provided in accordance with an exemplary embodiment of the present disclosure. FIG. 6B shows the object surveillance window 230 of FIG. 6A in greater detail. The display region 231 located in the center of the object surveillance window 230 is used to display the selected video sequence. The display region 231 further labels the camera number, recording time and object information of each object associated with the selected video sequence. For instance, the video sequence shown in FIG. 6B was captured by the No. 1 camera, thus the display region 231 shows the label No. 1 camera.

The list of previous video sequences related to the user-selected object or video sequence 232 may be used for displaying video sequences containing potentially matching objects that appeared before the selected time in cameras other than the user-selected camera. The video sequences of potentially matching objects may be arranged in descending order according to the object correspondence score.

Moreover, a video sequence in the list of previous video sequences related to the user-selected object or video sequence 232 may be the overall video sequence of a potentially matching object presented by the camera, a part of the video sequence of a potentially matching object captured by the camera, a part of video sequence of a potential matching object captured by the camera in the surveillance region, or an object trace image resulting from the superposition of the trace associated with the potentially matching object. The methods just described for displaying a video sequence containing a potential matching object in the list of previous video sequence related to the user-selected object or video sequence 232 should not be used to limit the present disclosure.

The list of post video sequences related to the user-selected object or video sequence 233 may be used for displaying the video sequences having potentially matching objects that appeared a few seconds after the current playback time and in cameras other than the user-selected camera. The video sequences of potentially matching objects may be arranged in descending order according to the object correspondence score. The object linking result before the selected time 234 is used for displaying video sequences of the selected object appeared in the surveillance region captured and monitored by cameras other than the selected camera before the selected time. The video sequences are arranged in chronological order. The video sequences in the object linking result before the selected time 234 may display the complete video sequence of the potentially matching object captured by the camera, a part of the video sequence of the potentially matching object captured by the camera or an image resulting from superposition of the trace associated with the potentially matching object appearing in the surveillance region.

The object linking result after the selected time 235 is used for displaying a video sequence of the use-selected object that appears in the surveillance regions monitored by cameras wherein the video sequence was captured after the selected time. The video sequences are arranged and displayed in chronological order. The video sequences in the object linking result after the selected time 235 may display the complete video sequence of the potentially matching object captured by the camera, a part of the video sequence of the potentially matching object captured by the camera or an image resulting from superposition of the trace associated with the potentially matching object appeared in the surveillance region.

Figure 7:
FIG. 7 is a detailed diagram illustrating an object surveillance window showing mislinked objects in the multiple camera video surveillance system provided in accordance with an exemplary embodiment of the present disclosure.

FIG. 7 is a detailed diagram illustrating an object surveillance window showing mislinked objects in the multiple camera video surveillance system provided in accordance with an embodiment of the present disclosure. It may be noted from FIG. 7, linking errors occurred when the multiple camera video surveillance system 100 conducts object linking to object with object ID "123". The multiple video content analysis unit 140 may provide incorrect object linking results for various reasons causing different objects to be identified as the same object. The described errors can occur during real-time surveillance or post review process operation. Consequently, the interactive user platform 150 may present incorrect trace information and historical image of the specific object to track.

When the user views the trace information and historical image of the specific object to track, the user may find that different objects have been assigned the same object ID. In FIG. 7, the object with object ID "123" is the object selected by the user as the specific object to track. The display region 231 of the object surveillance window 230 displays the video sequence captured by the No. 1 camera with the recording time 12:06:30. As object "123" has been selected by the user, the multiple video content analysis unit 140 therefore conduct automatic object linking for that specific object to track, i.e., the object of object ID "123".

The object with ID "123" in the instant embodiment is the person I, however the multiple video content analysis unit 140 may mistakenly identify person II as the same object and generated an incorrect linking result. Consequently, the video sequence presented in the object linking result after the selected time 235 is not the correct trace of person I.

To correct the trace for object "123", the user must select the video sequence which the user considers to be correct from the list of post video sequences related to the user-selected object or video sequence 233. For the instant embodiment, the user may select the video sequence of object with ID "126" which is captured by the No. 12 camera at the recording time 12:06:40. Once selected, the display region 231 may display the video sequence selected by the user from the list of post video sequences related to the user-selected object or video sequence 233. After the user selects the object "126" (i.e., person I), the interface displays a dialog confirming whether or not to perform the correction. After the user confirms the correction operation, the interface sends the correction data to the multiple video content analysis unit 140. The multiple video content analysis unit 140 corrects the object information for object "123" according to the correction data. Object "123" and object "126" will be re-compared in all video sequences captured after 12:06:40 to correct the linking result such that person I becomes labeled as object "123" and person II becomes labeled as object "126. The corrected linking result is not only sent to the interactive user platform 150 but also stored in the video and analysis data database 130.

As the video sequence selected by the user to correct an object linking error is not the video sequence calculated to have the highest probability, the interactive user platform 150 needs to notify the multiple video content analysis unit 140 that the specific object to track appears in the video sequence of object "126" captured by No. 12 camera at 12:06:40. The multiple video content analysis unit 140 performs object comparison of the object information in the user-selected video sequence with the specific object to track and further boxes the suggested object to link using a red dotted-line border. If the user verifies that the suggested object to link is the correct object, the user only needs to click the red dotted-line border and, without any further confirmation, the interactive user platform 150 sends the correction data to the multiple video content analysis unit 140. Conversely, if the user considers the suggested object as incorrect, then the user may click another boxed object. After the user clicks, the interface asks the user to confirm the correction operation. Upon an affirmative reply, the interactive user platform 150 sends the correction data to the multiple video content analysis unit 140.

After thoroughly describes the interface used in the correction method for linking objects in video sequences provided by the exemplary embodiment of the instant disclosure, next employs a flow chart diagram to explain each steps in the correction method for linking objects in video sequences. FIG. 8-1 and FIG. 8-2 provide flowcharts illustrating a correction method for linking objects in video sequences provided in accordance with an exemplary embodiment of the present disclosure. First, in Step S800, the multiple camera surveillance video system acquires the video associated with each camera in the multiple camera surveillance video system. Subsequently, in Step S801, each video sequence is analyzed to obtain object information associated with each object in each video sequence, wherein the object information includes but not limited to object ID, object characteristics, and object type.

Then, in Step S802, an interactive user platform is provided to the user to allow the user to select a specific object to track. In Step S803, the multiple camera surveillance video system computes the correspondence between the specific object and the potentially matching objects in the video sequences captured by each camera before the recording time of the selected video sequence. In Step S804, the multiple camera surveillance video system computes the correspondence between the specific object to track and the potentially matching objects in the video sequences captured by each camera after the recording time of the selected video sequence.

In Step S805, the multiple camera surveillance video system automatically links the objects appearing in each video sequence to obtain the trace information and historical video sequence associated with the specific object to track, wherein the automatic object linking method is to link the specific object to track with the potentially matching object having the highest correspondence score.

In Step S806, the video sequence of each object is listed in order in the list of previous video sequences related to the user-selected object or video sequence according to the correspondence between the specific object to track and video sequences which are captured by each camera before the recording time of the selected video sequence. In Step 807, the video sequence of each object is listed in order in the list of post video sequences related to the user-selected object or video sequence according to the correspondence between the specific object to track and video sequence captured by each camera after the recording time of the selected video sequence.

In Step S808, video sequences related to the trace information and historical image of the automatically-linked specific object to track are sequentially listed in the object linking result before the selected time of the interactive user platform, wherein the specific object to track are captured by cameras other than the user-selected camera before the recording time of the selected video sequence in the object linking result before the selected time of the interactive user platform. In Step S809, the video sequences related to the trace information and historical image of the automatically-linked specific object to track are sequentially listed in the object linking result after the selected time of the interactive user platform, wherein the specific object to track are captured by cameras other than the selected camera after the recording time of the selected video sequence in the object linking result after the selected time of the interactive user platform.

If the user finds that the automatically-generated object linking result is incorrect, the user may select the correct linking object to link from a video sequence that does not have the highest correspondence score in the list of post video sequence related to user selected object or video sequence. In Step S810, the interactive user platform determines whether or not a video sequence not having the highest correspondence has been selected from the list of post video sequences related to the user-selected object or video sequence. If such a video sequence has not been selected, the automatically-generated linking result is correct and the object linking process is terminated.

Conversely, if a video sequence not having the highest correspondence has been selected from the list of post video sequences related to the user-selected object or video sequence, then, in Step 811, the selected video sequence is displayed as the currently-selected video sequence. The user is asked whether or not to correct the automatically-generated object linking result after the user selected one of the objects for correction in the selected frame of the selected video sequence. If the user replies in the negative, then the correction method for linking the specific object to track in the selected video sequence is terminated. On the other hand, if the user confirms the correction operation then as described in Step S812, the interactive user platform generates the correction data identifying the correct object in the selected video sequence and sends the correction data to the multiple camera surveillance video system so as to direct the multiple camera surveillance video system to generate the suggested object linking correction results.

Subsequently, in Step S813, the interactive user platform requests the user to decide whether or not to adopt the suggested object linking results as the correct linking result for the specific object to track. If the user replies in the affirmative, then in Step S814 the suggested object linking correction result is used as the correct linking result of the specific object to track and the correction method for linking object in the selected video sequence is terminated. Conversely, if the user replies in the negative, then returns to Step S810.

In summary, the exemplary embodiment of the present disclosure provides a multiple camera surveillance video system having a correction method for linking an object in the selected video sequence. The multiple camera surveillance video system further has an interactive user platform provided for user to perform operations. The user may thereby correct the possible linking errors in the automated object linking process of the conventional multiple camera surveillance video system by executing the correction method.

The above-mentioned descriptions represent merely an exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method of forming a trace of an object, adapted for a multiple camera surveillance video system, the method comprising:
   a. selecting an object to track through an interactive user platform;
   b. identifying a first plurality of video sequences captured by the multiple camera surveillance video system within a recording time period, wherein each video sequence is associated with a level of correspondence to the object to track;
   c. generating a first object linking result by linking a second plurality of video sequences out of the first plurality of video sequences according to the levels of correspondence to the object to track; and
   d. if an error is found in a video sequence of the first object linking result, generating a second linking result from the first object linking result by replacing the erroneous video sequence with a video sequence selected through the interactive user platform and updating video sequences after the erroneous video sequence in the first object linking result according to the selected video sequence, wherein the selected video sequence is associated with a level of correspondence less than a level of correspondence associated with the erroneous video sequence.

2. The method according to claim 1, wherein the erroneous video sequence and the selected video sequence are recorded by different cameras.

3. The method according to claim 1, wherein the first plurality of video sequences comprises previous video sequences recorded before a recording time and post video sequences recorded after the recording time, wherein the interactive user platform comprises surveillance windows for displaying currently surveillance objects, the previous video sequences and the post video sequences.

4. The method according to claim 1, wherein step b further comprising:
   analyzing each video sequence according to the object to track to find potentially matching objects in each video sequence; and
   computing the correspondences between the specific object to track and the potentially matching objects in the video sequences, wherein each correspondence is computed using a multiple video content analysis unit of the multiple camera surveillance video system.

5. The method according to claim 1, wherein the erroneous video sequence and the selected video sequence are determined by viewing the first linking result and the selected video sequence concurrently through the user platform.

6. The method according to claim 3, wherein the interactive user platform further comprises: a surveillance environment window, containing a conceptual diagram of the environment, wherein the conceptual diagram of the environment is used for displaying an overall surveillance environment of the multiple camera surveillance video system, wherein the surveillance environment comprises geographical characteristics of the surveillance environment, the locations of each camera and the trace of the specific object to track in the surveillance environment; a camera listing window, for displaying the assigned number of each camera and the relations among locations of the cameras in the surveillance environment; and a multiple camera video sequence window, for displaying real-time video sequences captured by the user-selected cameras or for playing the historical video information of the user-selected cameras stored in a database.

7. The method according to claim 6, wherein the surveillance environment window further comprises: a playback control unit, for tracking, displaying and correcting the post historical trace of the specific object to track and to control the playback operations of the video sequences; and a time-axis control element, for controlling the playback of video information before or after a selected time.

8. The method according to claim 6, wherein the conceptual diagram of the surveillance environment is selected from a group comprising of a geographical environment diagram, a building schematic diagram, a surveillance equipment distribution diagram, and the superposition thereof, or is the superposition representation using a three-dimensional computer graphic.

* * * * *